No. 653,113. Patented July 3, 1900.
D. NOBLE.
OVERSEAM EYELET.
(Application filed Mar. 5, 1900.)
(No Model.)

WITNESSES:
J. F. Finch
S. Kind.

INVENTOR
D. Noble
BY A. Steward.
ATTORNEY

THE NORRIS PETERS CO., PHOTO-LITHO., WASHINGTON, D. C.

UNITED STATES PATENT OFFICE.

DONALD NOBLE, OF LONDON, ENGLAND, ASSIGNOR TO THE WHEELER & WILSON MANUFACTURING COMPANY, OF BRIDGEPORT, CONNECTICUT.

OVERSEAM-EYELET.

SPECIFICATION forming part of Letters Patent No. 653,113, dated July 3, 1900.

Application filed March 5, 1900. Serial No. 7,410. (No model.)

*To all whom it may concern:*

Be it known that I, DONALD NOBLE, a subject of the Queen of Great Britain, and a resident of 11 to 21 Paul street, Finsbury, London, E. C., England, have invented certain new and useful Improvements in Eyelets, of which the following is a specification.

My invention relates to certain new and useful improvements in eyelets, and has especial reference to that class of eyelets made by punching or puncturing a hole in the material in which the eyelet is located and then encircling the perforation thus made with radial or overcast stitches.

When very small eyelets are made—such as are used in shirt-bosoms, &c.—it is unnecessary to punch out a hole for the reason that the needle will by its repeated piercing of the material at the eyelet center form an aperture of sufficient size. Also in making eyelets in knit goods it is better to make the hole by piercing, as with a sharp-pointed spur, rather than by cutting with a punch, so that none of the material will be removed, the threads of the latter being simply forced apart sufficiently to obtain an aperture of the desired size.

The object of my invention is to provide an eyelet of this description whose stitches shall be securely fastened or "locked" against unraveling, thus greatly strengthening the eyelet and rendering the same more serviceable.

Figure 1:
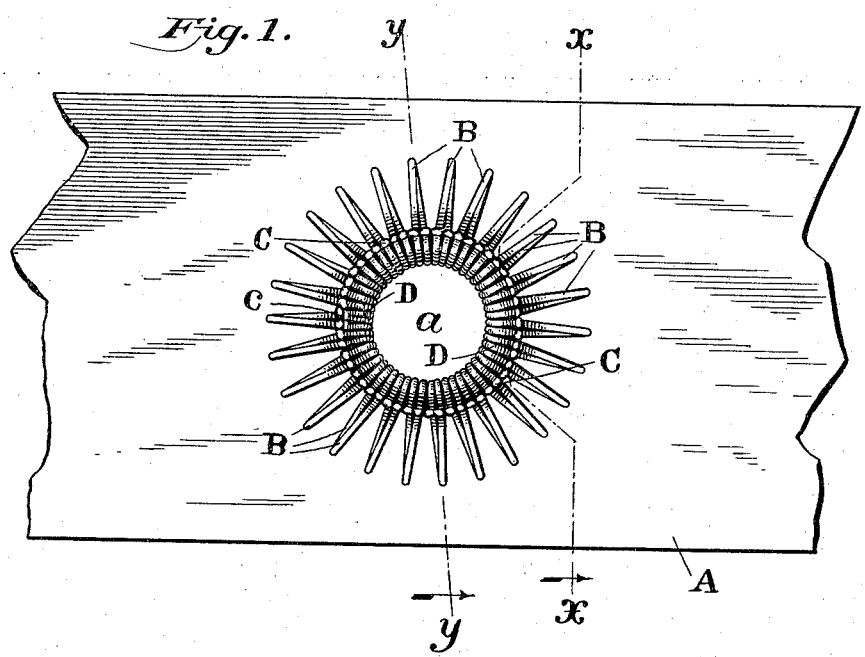
Figure 2:
Figure 3:
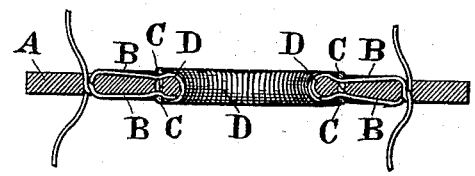

Referring to the accompanying drawings, which form a part of this specification, Figure 1 is a plan view of an eyelet constructed in accordance with my invention; Fig. 2, a sectional elevation taken on the line *x x* of Fig. 1, and Fig. 3 a similar view taken on the line *y y* in Fig. 1.

Similar letters of reference denote like parts in the several figures.

A is the material within which the eyelet is located and which of course forms a part thereof, and *a* is a perforation made therein of any desired size.

The edge of the perforation *a* is overseamed by radial stitches B. The overseam-stitches B may be of any convenient or desired length and may, if so desired, be overlapped somewhat at the beginning and termination thereof; but for the purposes of my invention the complete encircling of the perforation with overseam-stitches is quite sufficient without overlapping the latter at all.

C is a line of plain lock-stitches laid upon and intersecting the radial overseam-stitches at any desired distance from the edge of the perforation *a*, but preferably in the relative position shown in Fig. 1. Said line of plain lock-stitches C is preferably somewhat overlapped at the beginning and termination thereof, as shown at *c*, Fig. 1. The principal function of said line of plain stitches C is to securely fasten the radial stitches B and prevent the latter from unraveling; but said plain stitches C not only serve to secure said radial stitches in place, but also cause a rounded bead or purl D to be formed upon the inner or wearing edge of the eyelet, as clearly shown in Figs. 1 and 3.

As shown in the drawings, each one of the radial stitches B is stitched down or secured in place by a separate plain lock-stitch C, (see Fig. 2;) but I do not wish to be confined to securing each separate one of the radial stitches by a separate plain lock-stitch, since the number of the latter with respect to the former may be varied without departing from the spirit of my invention, the gist of which resides in the broad idea of stitching down or fastening the radial or overseam stitches with a line of plain stitches encircling the eyelet-perforation and intersecting said radial stitches.

By reference to Fig. 2 it will be observed that the interlocked radial and plain stitches at the point where the section is taken present the appearance of a closely-interwoven fabric, the advantage of which will be apparent.

By fastening each of the radial stitches with a separate plain lock-stitch intersecting and overlying said radial stitches, which is my preferred form of construction, an eyelet is obtained possessing great strength and durability, for the reason that the radial stitches thereof are separately secured or anchored as against unraveling, and in addition thereto the line of plain stitches when considered independently of their function of anchoring the radial stitches contribute an additional element of strength of considerable importance.

Stitched eyelets are, as a rule, formed in material composed of several plies, and the line of plain lock-stitches encircling the perforation serves also to unite the several plies of material firmly together. Furthermore, the rounded bead or "purl" formed on the inner or wearing edge of the eyelet, caused by the laying of the plain stitches, considerably enhances the appearance of the eyelet, thus increasing its attractiveness and likewise adding to the commercial value thereof.

Having thus fully described my invention, what I claim as new, and desire to secure by Letters Patent, is—

The herein-described seam for sewed articles comprising a fabric provided with a perforation, the edge of which perforation is provided with a series of contiguous overedge-stitches and also provided with a line of plain lock-stitches intersecting and securing said overedge-stitches at a point intermediate said perforation and the outer extremity of said overedge-stitches.

Signed at Bridgeport, in the county of Fairfield and State of Connecticut, this 1st day of March, A. D. 1900.

DONALD NOBLE.

Witnesses:
A. STEWARD,
C. N. WORTHEN.